T. TRIONE.
SLEIGH ATTACHMENT FOR AUTOMOBILES.
APPLICATION FILED NOV. 29, 1915.
1,194,794.
Patented Aug. 15, 1916.
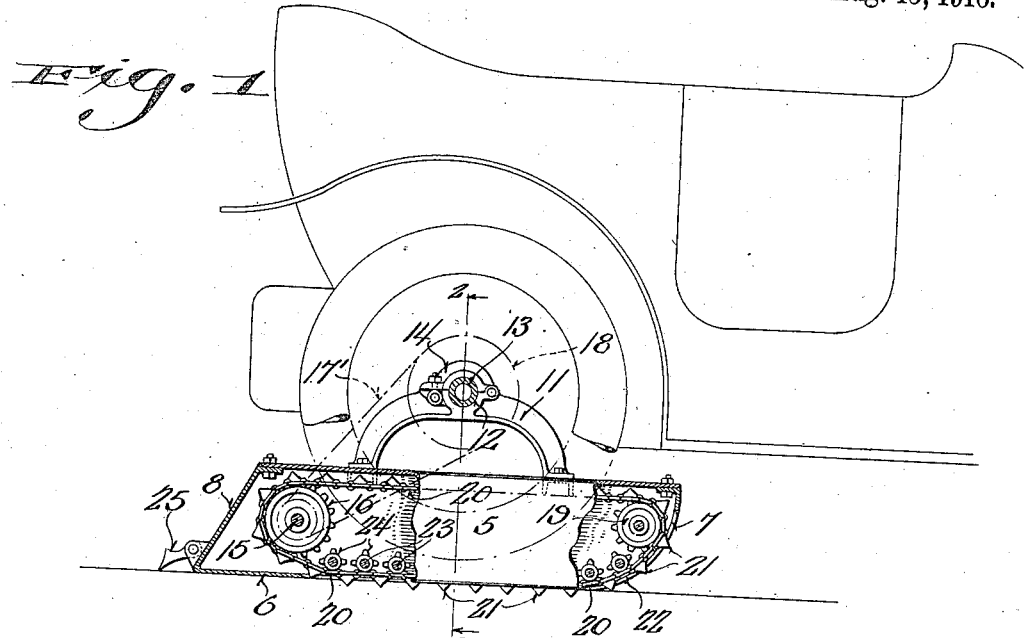
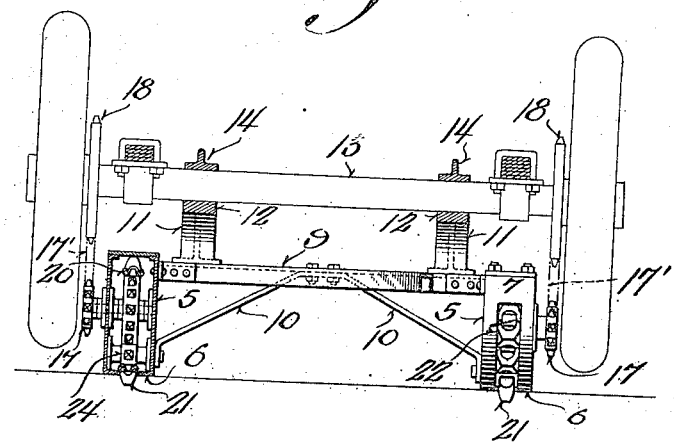

UNITED STATES PATENT OFFICE.

THOMAS TRIONE, OF IRON BELT, WISCONSIN.

SLEIGH ATTACHMENT FOR AUTOMOBILES.

1,194,794.  Specification of Letters Patent.  Patented Aug. 15, 1916.

Application filed November 29, 1915. Serial No. 63,928.

*To all whom it may concern:*

Be it known that I, THOMAS TRIONE, a citizen of the United States, and resident of Iron Belt, in the county of Iron and State of Wisconsin, have invented certain new and useful Improvements in Sleigh Attachments for Automobiles; and I do hereby declare that the following is a full, clear, and exact description thereof.

The present invention relates to new and useful improvements in motor driven sleigh structures, and is more particularly directed to the provision of a sleigh structure which may be detachably associated with an automobile or other vehicle, to be driven by the motive power of the vehicle.

It is in general the object of the present invention to simplify the structure and improve the efficiency of the device of this character.

It is more specifically an object to provide in a sleigh runner casing including a spur sprocket chain of the caterpillar type, means coacting to hold the chain in proper relation to the runner portion of the casing, and to prevent entrance of snow or other matter into the casing.

It is further an object to provide such a structure wherein the spur carrying chain is carried upwardly at the curved forward end of the casing to provide for operation of the device should the runner casing be disposed over a depression in such manner as to greatly dispose the major portion of the body above the adjacent ground.

With the above and other objects and advantages in view, the invention resides more particularly in the novel combination, arrangement and formation of parts more particularly hereinafter described and particularly pointed out in the appended claims.

In the drawings: Figure 1 is a side elevation of the rear portion of an automobile, showing the improved sleigh structure associated therewith with the automobile illustrated in conventional alinement, and portions of the runner casing broken away more clearly disclosing the interior structure. Fig. 2 is a sectional view taken on the line 2—2 of Fig. 1, one end portion of this view showing one of the runner casings and adjacent connecting structure in front end elevation.

Referring now more particularly to the accompanying drawings, there is provided a pair of runner casings each including the side walls 5, the bottom 6, the upwardly curved front wall 7 and the forwardly slanting rear wall 8. A pair of straight transverse channel bars 9 connect adjacent sides of the casing and braces 10 extend from said sides to the bars whereby a rigid frame structure is provided. For securing this frame to the rear axle of the automobile, a pair of upwardly bowed bars 11 connect the channel bars 9, adjacent their ends and the intermediate portions of the bars 11 are provided with transverse grooves 12 for fitting the axle 13 of the automobile and pivoted to each bar 11 is a curved clamping arm 14 whereby the bars may be firmly secured to the axle in a detachable manner.

Journaled in the rear portion of each casing is a shaft 15 which carries within the casing a drive sprocket wheel 16 and which extends outwardly of the casing at its outer side to carry a sprocket wheel 17 which is driven by a chain 17' trained about a sprocket wheel 18, carried by and rotatable with the gear axle structure. Mounted in the said portion of the casing is an idle sprocket 19 and trained about the wheels 15 and 19, is a chain 20 alternating links of which carry spurs 21. To hold the adjacent stretch of the chain 20 adjacent the slot 22, which extends longitudinally through the bottom and curved front portions of the casing so that the spurs project outwardly therefrom, shafts 23 are disposed transversely at spaced intervals in the bottom portion of the casing and these shafts carry sprocket pintles 24 which mesh with the chain. The teeth of these pintles engage in the alternate open links and serve to prevent entrance of snow or other matter into the casing. A further advantage in this construction is that the shafts 23 by their connection with the sides serve to strengthen the casing with respect to the slot 22. The sprocket pinions 24 are continued at the front of the casing upwardly along the front wall 7 and the idle sprocket 19 is so disposed with respect to the peripheral slot that it also performs the function of the sprocket pintles. Thus it is noted that the working stretch of the chain is continued upwardly at the grooved front portion of the runner so that should the runner lie in a position in which it is disposed over a depression in the ground whereby the major portion of the runner would be spaced above the ground the chain would operate at the forward curved portion of the runner to propel the vehicle.

The sleigh structure described is adapted for the rear portion of a vehicle, and it will be readily understood that any desired structure may be provided for procuring a runner support of the front portion of a vehicle.

Each of the runner casings preferably carries a pivoted dog 25 at its rear end which slide over the ground upon propulsion of the vehicle and which engages in the ground to prevent undesired retrograde movement of the vehicle.

Although the present structure has been shown and described as an attachment for converting automobiles or other wheeled vehicles into sleighs, it will be readily understood that various features of the present invention may be equally well associated with any other sleigh structure such as bob sleds or the like, and that the runner casing described may comprise the rear runners of bob sleds and may be driven by a suitable engine carried on the sled.

I claim:

1. In a sleigh structure, a runner casing provided in its bottom with a longitudinal slot, sprocket wheels in the casing, a sprocket chain trained about said wheels, spurs carried by certain links of the chain and sprocket pinions disposed in the casing, adjacent the slot and meshing with said chain to hold the chain adjacent the slot and to close the link apertures of the chain.

2. In a sleigh structure, a runner casing, provided with a longitudinal slot in its bottom, sprocket wheels in the casing, a spur sprocket chain carried by said wheels, transverse shafts secured to the sides of the casing adjacent the slots and sprocket spurs carried on said shafts and meshing with the chain.

3. In a sleigh structure, a runner casing having an upwardly curved forward end, the bottom and said forward end being provided with a longitudinal slot, a driving sprocket in the rear portion of the casing, a sprocket in the forward portion of the casing, a spur chain trained about said sprockets, and spur pinions journaled in the casing adjacent the bottom and forward end for holding and guiding the chain adjacent the slot.

In testimony that I claim the foregoing I have hereunto set my hand at Iron Belt, in the county of Iron and State of Wisconsin in the presence of two witnesses.

THOMAS TRIONE.

Witnesses:
JOHN C. TRIONE,
AMANDA E. SIREN.

Copies of this patent may be obtained for five cents each, by addressing the "Commissioner of Patents, Washington, D. C."